W. M. WICKHAM.
ROAD GRADING AND EXCAVATING MACHINE.
APPLICATION FILED APR. 17, 1916.

1,308,383.

Patented July 1, 1919.
8 SHEETS—SHEET 1.

WITNESS:
Harry S. Gaither

INVENTOR
Walter M. Wickham
BY
Chamberlin & Freudenreich
ATTORNEYS

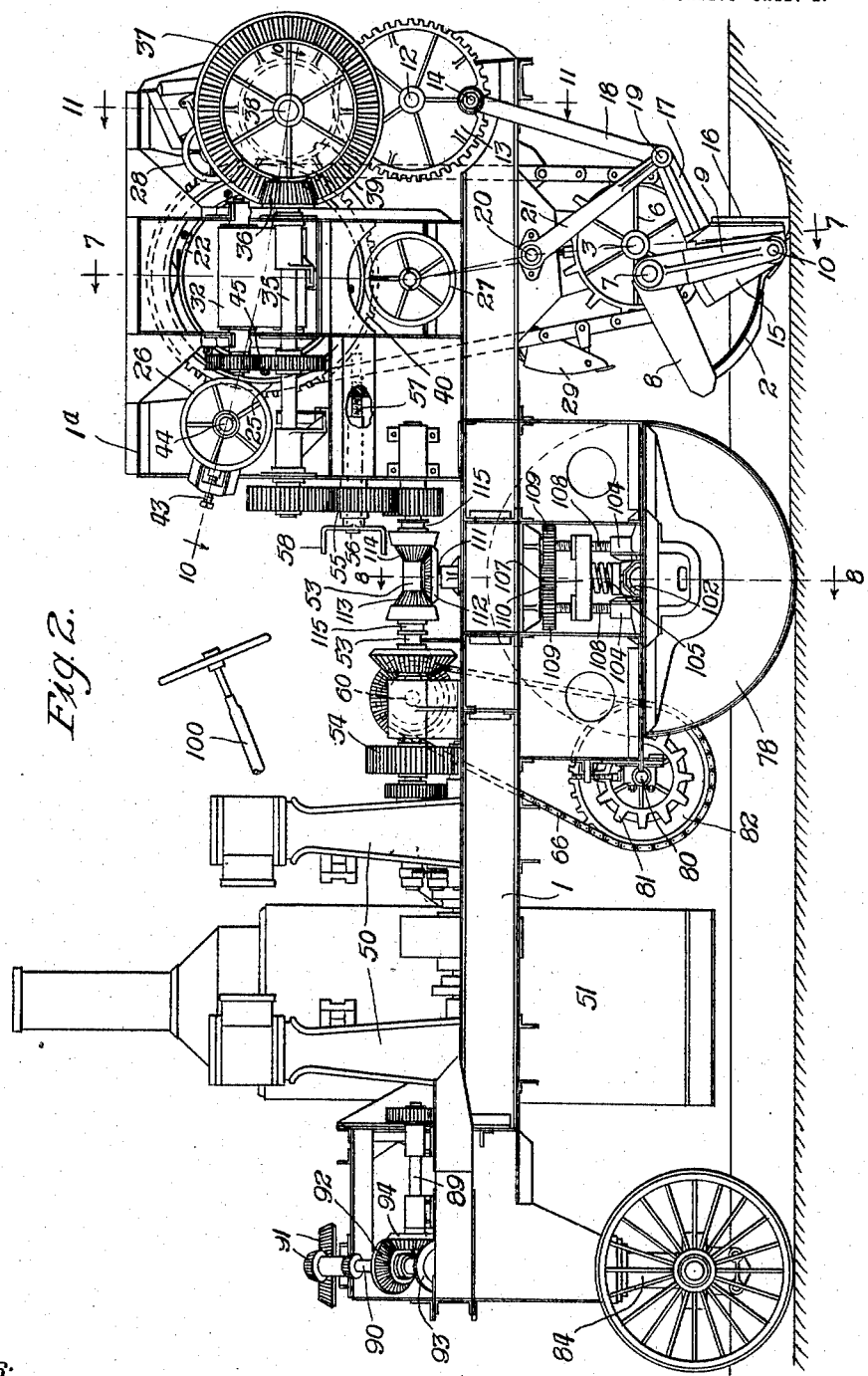

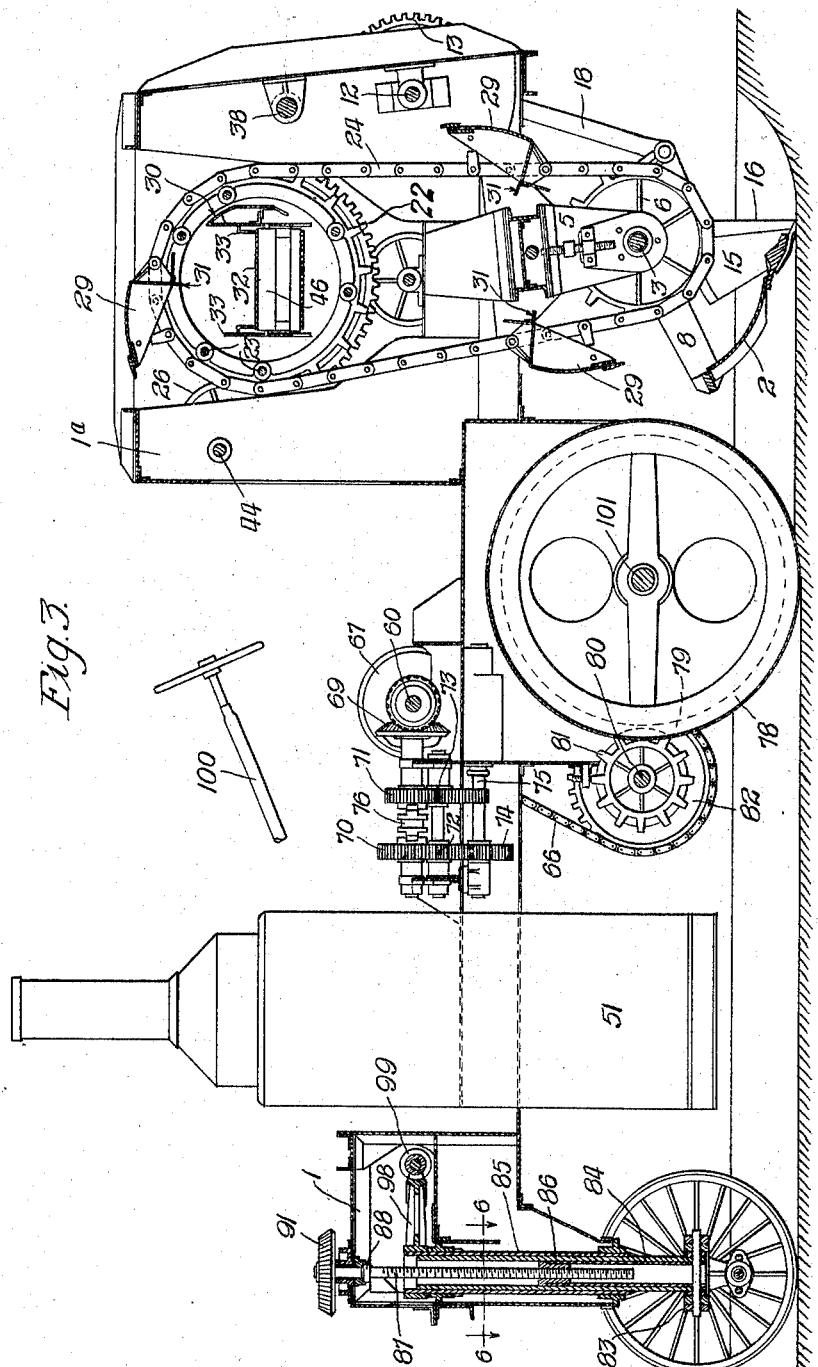

W. M. WICKHAM.
ROAD GRADING AND EXCAVATING MACHINE.
APPLICATION FILED APR. 17, 1916.
1,308,383.
Patented July 1, 1919.
8 SHEETS—SHEET 4.
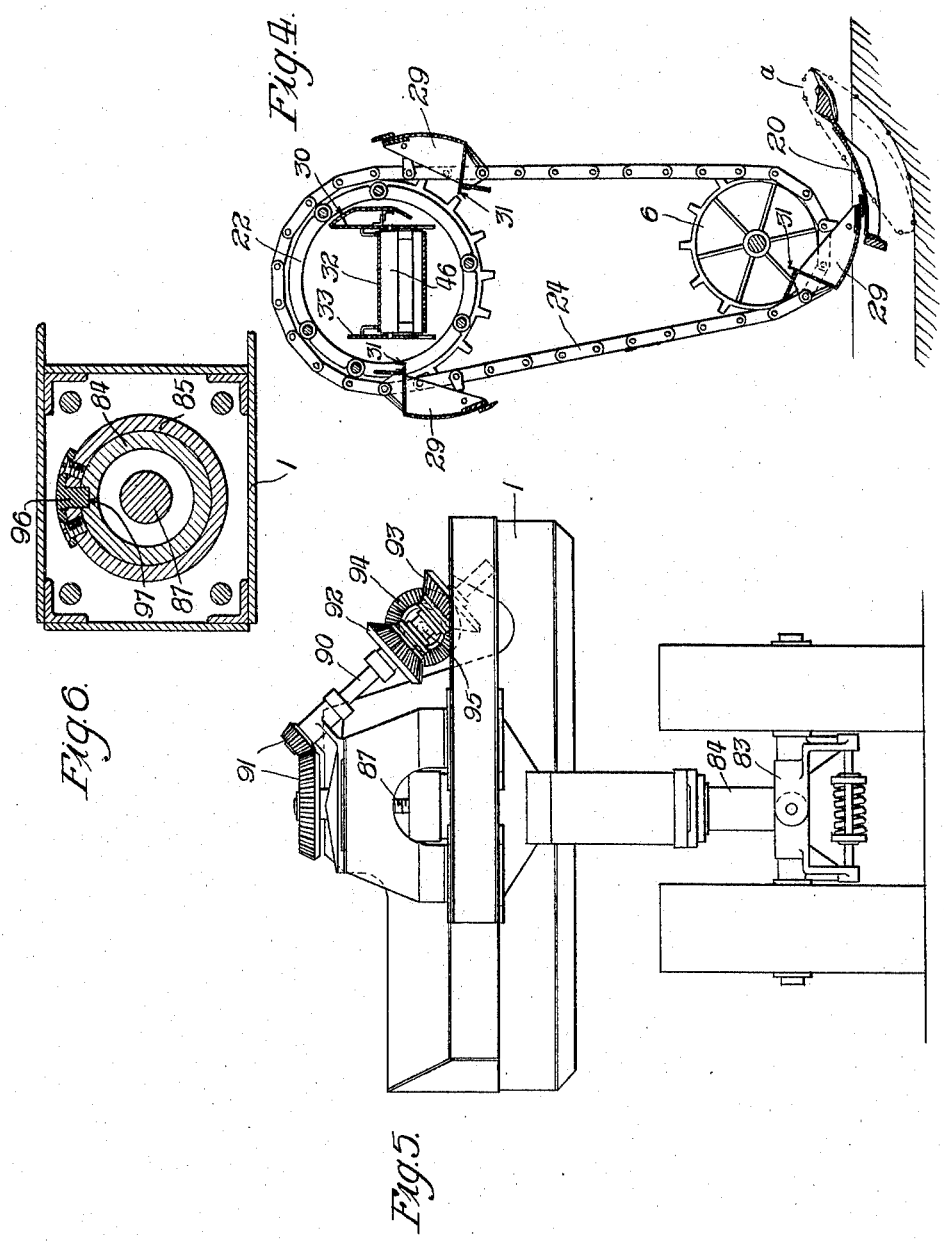

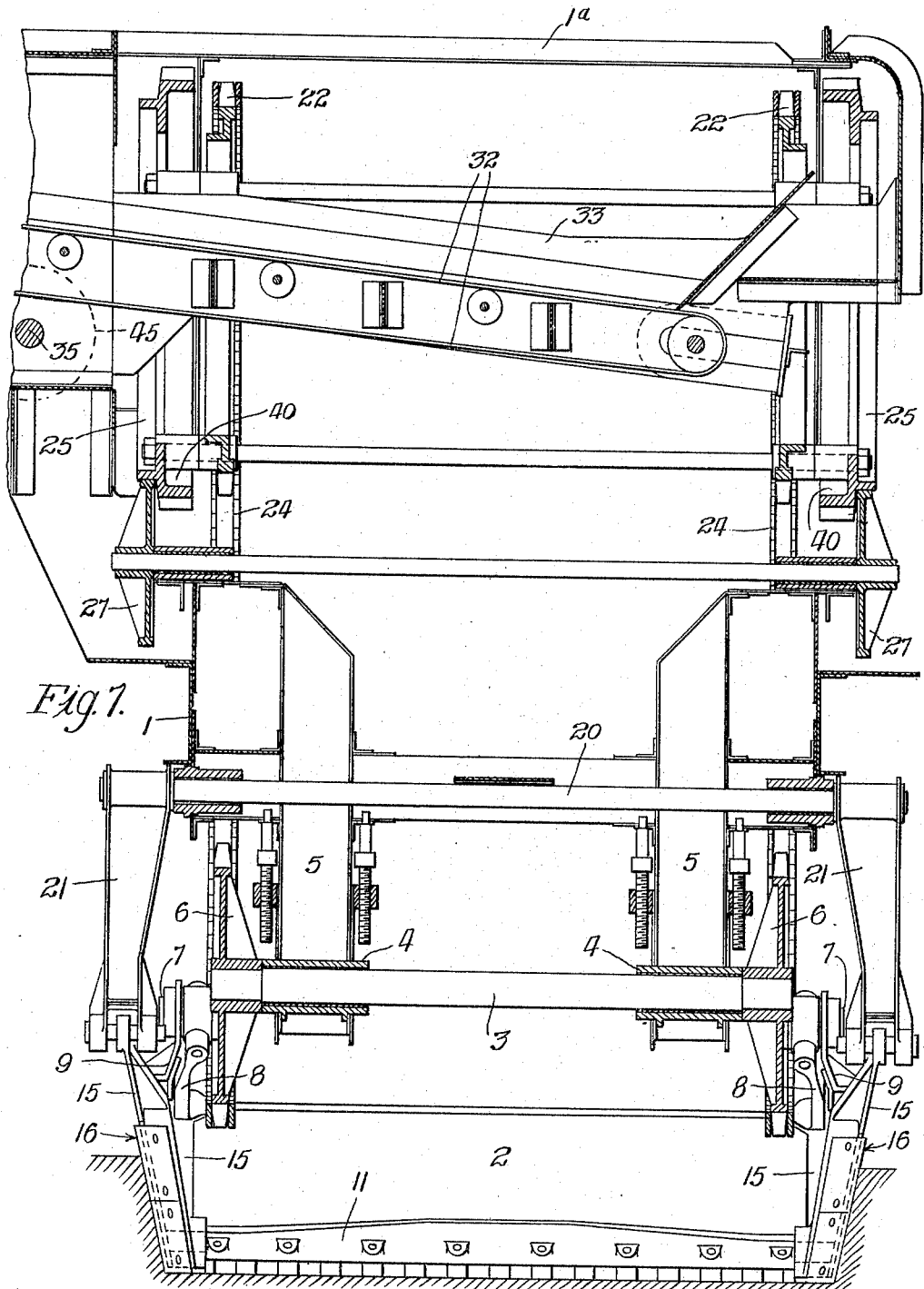

W. M. WICKHAM.
ROAD GRADING AND EXCAVATING MACHINE.
APPLICATION FILED APR. 17, 1916.
1,308,383.
Patented July 1, 1919.
8 SHEETS—SHEET 6.
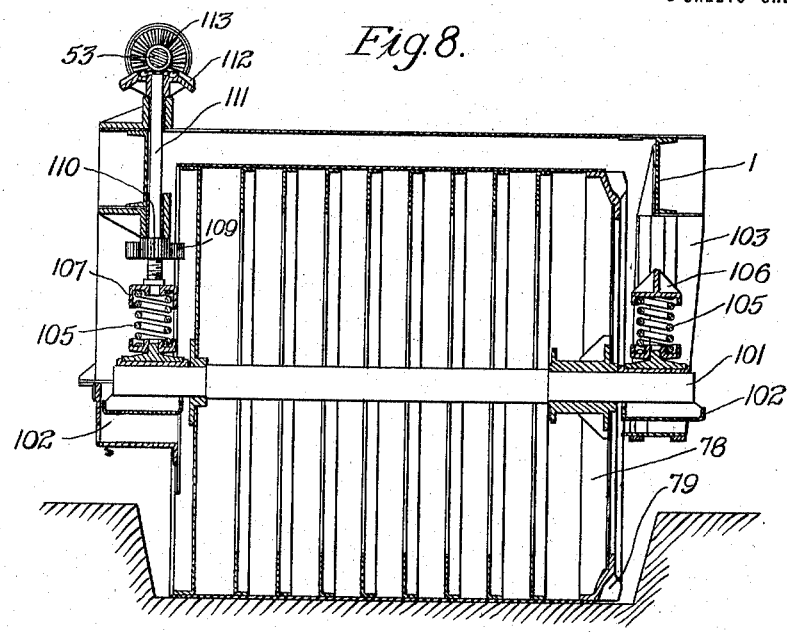
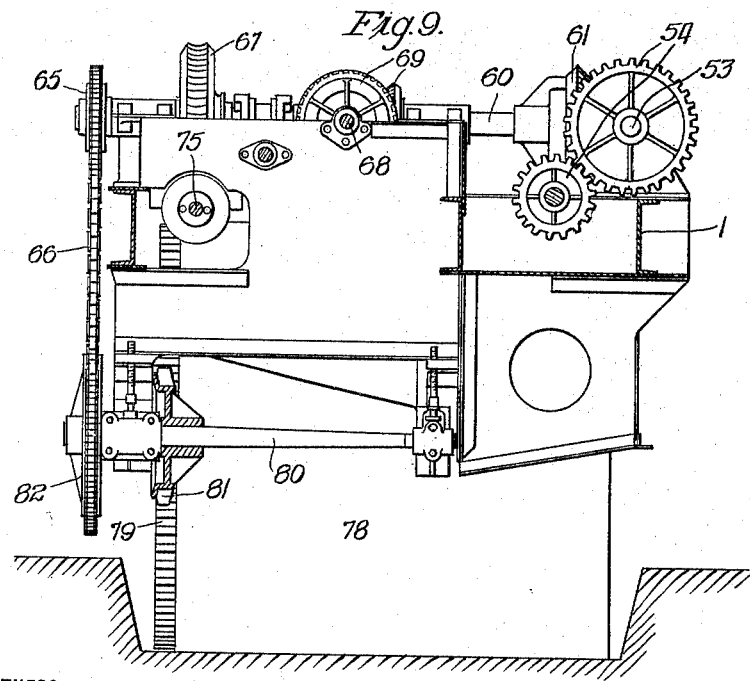
WITNESS:
INVENTOR
BY
ATTORNEYS W. M. WICKHAM.
ROAD GRADING AND EXCAVATING MACHINE.
APPLICATION FILED APR. 17, 1916.

1,308,383.

Patented July 1, 1919.
8 SHEETS—SHEET 7.

W. M. WICKHAM.
ROAD GRADING AND EXCAVATING MACHINE.
APPLICATION FILED APR. 17, 1916.
1,308,383.
Patented July 1, 1919.
8 SHEETS—SHEET 8.
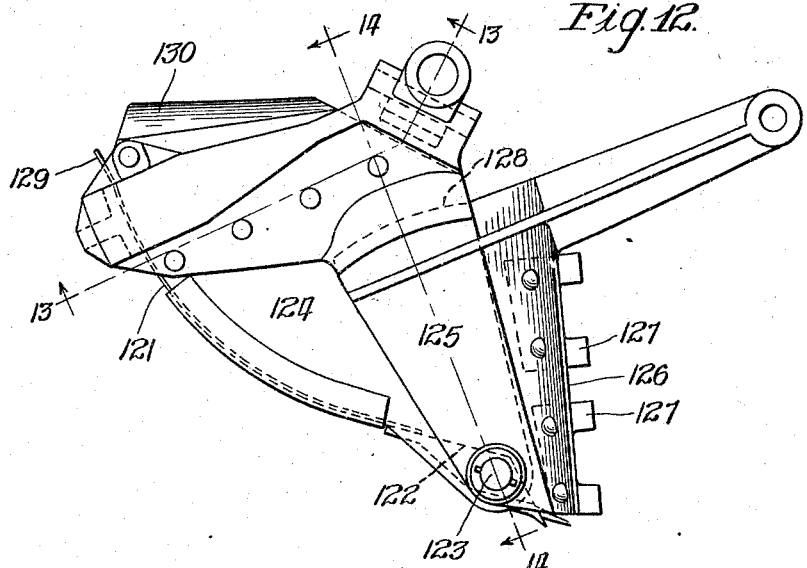
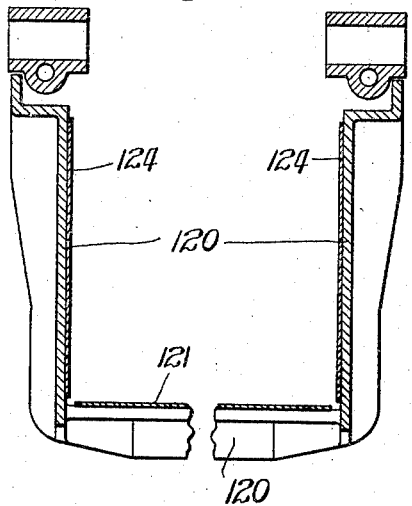
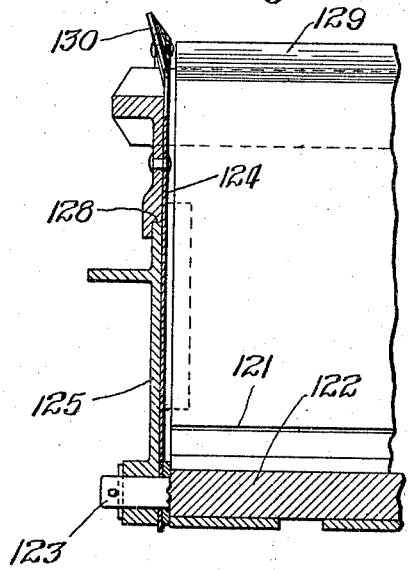
WITNESS:
INVENTOR
Walter M. Wickham
BY
Chamberlin Freudenreich
ATTORNEYS

UNITED STATES PATENT OFFICE.

WALTER M. WICKHAM, OF CHICAGO, ILLINOIS.

ROAD GRADING AND EXCAVATING MACHINE.

1,308,383.  Specification of Letters Patent.  Patented July 1, 1919.

Application filed April 17, 1916. Serial No. 91,521.

*To all whom it may concern:*

Be it known that I, WALTER M. WICKHAM, a citizen of the United States, residing at Chicago, county of Cook, State of Illinois, have invented a certain new and useful Improvement in Road Grading and Excavating Machines, and declare the following to be a full, clear, and exact description of the same, such as will enable others skilled in the art to which it pertains to make and use the same, reference being had to the accompanying drawings, which form a part of this specification.

My invention relates to the art of excavating and more particularly to a machine adapted for road grading purposes although of course applicable to other uses.

A road grading machine, that is a machine adapted to remove a ribbon or layer of material of considerable width and of a depth varying from a few inches to more than a foot in order to prepare a bed for receiving a pavement, while operating at times in comparatively soft material, often encounters very hard material such as an old Macadam road; and therefore, in order to make the machine successful it is necessary that it be powerful enough to operate effectively on comparatively hard compact material. Consequently, so far as I am aware, where an attempt has been made to produce a machine fulfilling the foregoing requirements the result has been a heavy cumbersome machine pratically incapable of traveling over soft grounds or roads, difficult to handle under even the most favorable conditions, and very expensive in operation.

The object of my invention is to produce a machine which, while extremely powerful so as to be capable of digging through comparatively hard material, shall be comparatively light in weight so that it may be moved about quickly from place to place over comparatively soft ground or roads.

A further object of my invention is to produce a machine of the character specified which will be easy to operate, will possess a flexibility permitting it to be adjusted quickly and conveniently to adapt it to any particular conditions that it encounters, and will do its work smoothly and efficiently.

It is evident that the principal load on an excavating machine is that produced by the act of cutting or tearing away the material to be excavated, particularly where such material is hard and compact, and that the work of removing the excavated material after it has been excavated is comparatively light. In carrying out my invention I have borne in mind this theory of distribution of the work and therefore, viewed in one of its aspects, my invention may be said to have for its object to produce a simple and efficient excavating machine in which the parts are so coördinated that powerful digging or excavating mechanism is used only for the purpose of excavating, while comparatively light conveying mechanism is employed solely for carrying the excavated material away.

Subsidiary to this last object my invention may be said to have for another of its objects to produce a simple and novel means for transferring the excavated material from the excavating means to a means for carrying the material away.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Fig. 2 is a side elevation of the machine;

Fig. 3 is a vertical longitudinal section through the machine;

Fig. 4 is a detail of the parts acting immediately on the material which is excavated, to remove the same, showing a different position of the parts than in Fig. 3;

Fig. 5 is a front elevation of the machine, all those parts which are located behind the steering post being omitted;

Fig. 6 is a section taken approximately on line 6—6 of Fig. 3;

Fig. 7 is a transverse section on an enlarged scale taken approximately on line 7—7 of Fig. 2;

Fig. 8 is a section taken approximately on line 8—8 of Fig. 2 on a scale somewhat larger than that of Fig. 2;

Fig. 9 is a section taken approximately on line 9—9 of Fig. 1 on the same scale as Fig. 8;

Fig. 12 is a side view on an enlarged scale of a modified shovel or excavator;

Fig. 13 is a section taken approximately on line 13—13 of Fig. 12; and

Fig. 14 is a section taken approximately on line 14—14 of Fig. 12.

Figure 1:
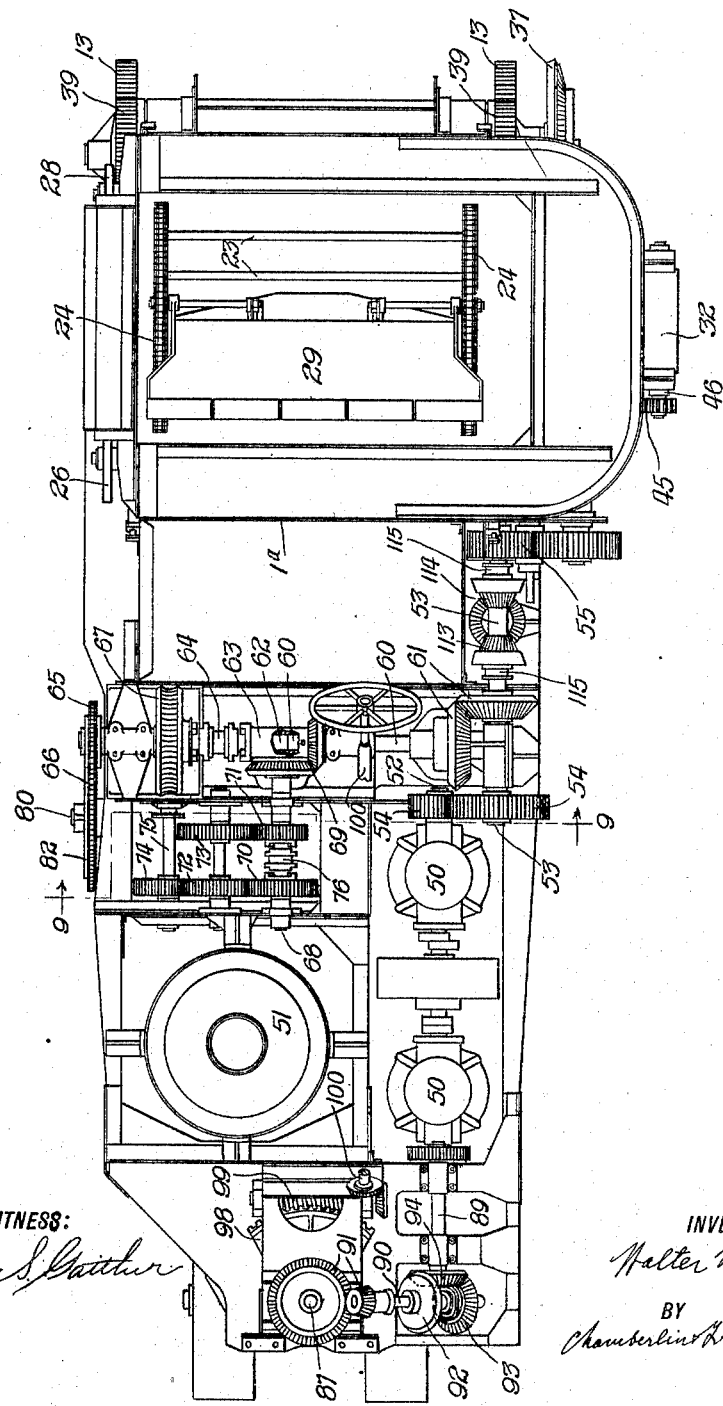
Figure 1 is a top plan view of a machine arranged in accordance with a preferred form of my invention.
Figure 10:
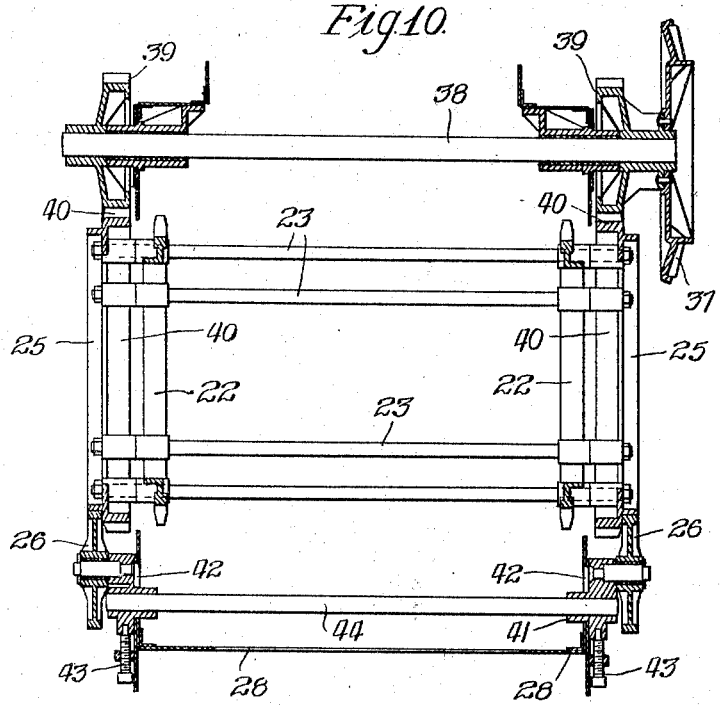
Fig. 10 is a section taken approximately on line 10—10 of Fig. 2 and on a somewhat larger scale than Fig. 2.

While my invention may be embodied in a great many different forms, for the sake of brevity and clearness I have illustrated and shall describe in detail only a single preferred embodiment with one slight modification; but I desire to have it understood that my invention is not limited to the particular mechanical details which I have used to illustrate the broad principle as well as a simple practical embodiment of my invention.

Reference being had to the drawings, 1 represents a strong horizontal bed or frame preferably built up of metal such as structural steel. The bed or frame is mounted on suitable supports, preferably rolling supports, and carries all of the excavating and discharging mechanism together with the power plant for operating the same. The machine which is illustrated is designed to have the excavating apparatus at the rear end and I therefore place the rolling supports at the front end and at an intermediate point. The excavating device consists of a wide short shovel, 2, hung beneath the frame in such a manner that it may be moved relatively to the frame, while the whole machine is traveling slowly, in such a manner that it will cut out a slice of material, rise high enough to clear the ground and then come back to a starting point to be in position to repeat the cycle. The machine travels backward while cutting, thus bringing the rolling supports on top of the graded surface from which a layer has been excavated. The shovel must therefore be wide enough to excavate a path for the rolling supports, this width being determined primarily by the width of the bearing required to give stability to the machine. By reason of my peculiar arrangement, as will hereafter appear, the center of gravity of the machine is exceedingly low and therefore I do not require a very wide base in order to secure the requisite stability. The result is that I am enabled to make a light narrow machine of great power and stability.

The particular means for supporting the shovel is a double crank comprising a shaft, 3, mounted in suitable vertically adjustable bearings, 4, arranged in posts, 5, extending downwardly from the side members of the frame. The cranks are in the form of sprocket wheels, 6, of which there is one on each end of the shaft outside of the bearings; each sprocket wheel having an outwardly projecting crank pin, 7. In the arrangement shown in Figs. 1 to 11, the shovel is supported from these crank pins by means of a U-shaped member, 8, whose arms are journaled at their upper ends on the crank pins while the yoke portion thereof is rigidly attached to the back end of the shovel, together with arms or links, 9, each of which is journaled at its upper end on one of the crank pins and at its lower ends upon trunnions, 10, forming extensions at the ends of the cutter bar or shearing member, 11, which is attached to the shovel and forms the effective front edge thereof. As the crank shaft revolves the pivotal axis of the shovel is carried in a path forming a horizontal cylindrical surface, this path being of course modified by reason of the advance of the machine in the cutting direction, thus making the path of this axis a continuous series of loops. Power is applied to the shovel at its cutting edge to carry it through the material to be excavated and in such a way that it shall be as nearly as possible in a direction tangential to the path of the cutting edge during the cutting stroke of the shovel. This I accomplish by placing on the rear end of the main frame above the shaft 3 and farther to the rear of the machine than the latter, a horizontal shaft, 12, having at its ends cranks which are conveniently made in the form of gear wheels, 13, provided with outwardly projecting crank pins, 14, and arranging a suitable driving connection between the crank pins, 14, and the trunnions, 10, on the shovel. In the arrangement shown, I have mounted on the trunnions, 10, inside of the arms, 9, a pair of side cutters which extend upwardly and, at least so far as their cutting edges, 16, (see Fig. 7) are concerned, diverge outwardly from the bottom toward the top; the upper ends of the side cutters being provided with arms, 17, projecting in advance of the cutting edges and hinged at their outer ends to connecting rods, 18, which are journaled on the crank pins 14. Between each of the pins 19 connecting the members 17 and 18 together and a supporting member, 20, on the main frame at a point above the shaft 3 is a rocker arm, 21. The member 20 may conveniently consist of a shaft extending across the machine and constituting a rocker shaft having the rocker arms, 21, fixed thereto. This arrangement permits the use of substantial simple bearings and adds stiffness and rigidity. The parts are operated in synchronism with each other so that the path of movement of the shovel is a composite one resulting from the travel of the carriage, the rotation of the crank shaft, 3, and the action of the shovel driving mechanism.

All that the shovel has to do is to cut out a slice of material and then travel back to the starting point to be in position to cut out the next slice. In order to remove the material that is excavated by the shovel I have provided means whose sole function is the removal of material as distinguished from the excavation of material. To this end I employ a conveyer of which the sprocket wheels, 6, form elements. As it will often be desired to have the excavating material raised to a point from which it can be discharged into the top of a wagon or cart by which it may be hauled away, I have made the conveyer take the form of an elevator which carries the excavated material to a point above the bed of the machine and delivers it to a suitable receiver by which it is discharged from the side of the machine. To this end I have arranged above the bed of the machine a horizontal rotatable member somewhat on the order of a squirrel cage. Primarily this member consists of two sprocket wheels, 22, in the form of annular toothed rings connected together by horizontal rods, 23, of such length that each of the sprocket wheels 22 will be over one of the sprocket wheels 6 on the shaft 3. Two endless chains, 24, pass over the sprocket wheels 6 and 22, one on each side of the machine. The receiver of the excavated material lies within this cage as will hereinafter be explained and therefore the cage must be supported from the exterior. The support of the cage is conveniently accomplished by securing on the rods, 23, outside of the sprocket wheels 22, ring-like members, 25, each of which constitutes a circular track or rail which is engaged by a plurality of rollers of which I have shown three, indicated at 26, 27 and 28. The rollers may be mounted in any convenient way upon the superstructure 1ª.

Between the sprocket chains are a series of auxiliary shovels or scoops, 29, three being illustrated. The parts are so proportioned and their movements are so timed that as the excavating shovel enters the material to be excavated, one of the auxiliary shovels or buckets approaches it from the rear and, as the operation progresses, passes forward through the shovel underneath the excavated material and removes this material from the excavating shovel so that when the excavating shovel returns to the starting point it is empty. In Fig. 3 the parts are shown in the positions that they occupy just before the shovel enters the material to be excavated while in Fig. 4 the parts are illustrated in the positions that they occupy when the excavating shovel has completed its excavating or digging stroke and is about to start back; the dotted line, a, in Fig. 4 indicating the path of the cutting edge of the shovel without reference to the bodily movement caused by the travel of the machine.

The auxiliary shovels or scoops are so constructed that they will retain their contents until they reach the cage. As the points of the sprocket chains to which the scoops are connected begin to pass over the cage, the scoops begin to assume a dumping position and, in order to prevent the material from dropping out before the scoops have been carried around to the top of the cage I have arranged within the cake adjacent to the upwardly traveling side a baffle plate or shield, 30, along which the edge of an extension plate, 31, at the rear end of each of the scoops will travel while each scoop is making the turn to get to the top of the cage; the member, 30, therefore serving as a temporary extra side for each scoop. The rods of the cage are of course so spaced that whenever one of the scoops reaches a dumping position a free space will be left between the rods in its vicinity, through which space the material may be dumped. In the arrangement shown, I have employed six rods and have arranged them in pairs, the rods of each pair being placed close together and the three pairs being spaced 120 degrees apart. The parts are so proportioned that each scoop when it reaches a dumping position is opposite a space between two sets of rods.

The receiver into which the material is discharged from the elevator may take any desired form. In the arrangement illustrated it is an endless belt, 32, extending through the cage from one end to the other and lying between suitable stationary walls, 33, which will prevent the material delivered thereto from falling off at the sides. As the material falls upon this belt it is carried outwardly to one side of the machine where it may be received by a wagon, cart or other conveying means or be simply discharged upon the ground.

All of the excavating and conveying means heretofore described are driven from a horizontal main shaft, 35, extending longitudinally of the machine past one end of the cage just below the endless belt, 32. On the rear end of this shaft is a bevel pinion, 36, meshing with a bevel gear wheel, 37, fixed on one end of a transverse horizontal shaft, 38, lying above the shaft 12 and in rear of the cage. On the shaft 38 are two pinions, 39, 39, each of which meshes with a gear, 40, connected to and preferably integral with one of the circular tracks or rails, 25, of the cage; thus applying a driving force to each end of the cage and avoiding twisting stresses. In order to maintain the pinions, 39, and gears, 40, in proper relation to each other and provide for wear, I have so arranged the supporting or guide rollers, 26, that they may be adjusted from and toward the axis of the shaft 38. This is conveniently accomplished by journaling the rollers 26 on blocks, 41, which are slidably supported on the superstructure 1ᵃ by having parts extending through slots, 42, in the walls of this superstructure; the blocks being moved along the slots and being held in any desired position therein by means of set screws, 43, or other suitable means. The blocks, 41, may conveniently be connected together by a rod or shaft, 44, which gives strength and rigidity to the guiding and supporting structure.

The shaft, 38, is placed about at the level of the point at which the upwardly moving portions of the sprocket chains 24 engage with the sprocket wheels 22 of the cage. In other words, the shaft 38 has its axis in approximately the same horizontal plane as the axis of the cage. The result is that the thrust between the driving pinions, 39, and the gears, 40, of the cage is directly in line with the path of movement of the ascending chains or, in other words, is substantially a direct drive for the chains, so that the cage and the guiding and supporting rollers are relieved of the stresses which would be imposed upon it if the driving pinions were located at any other point and which would make the load on the cage much greater than it is in the present construction.

Figure 11:
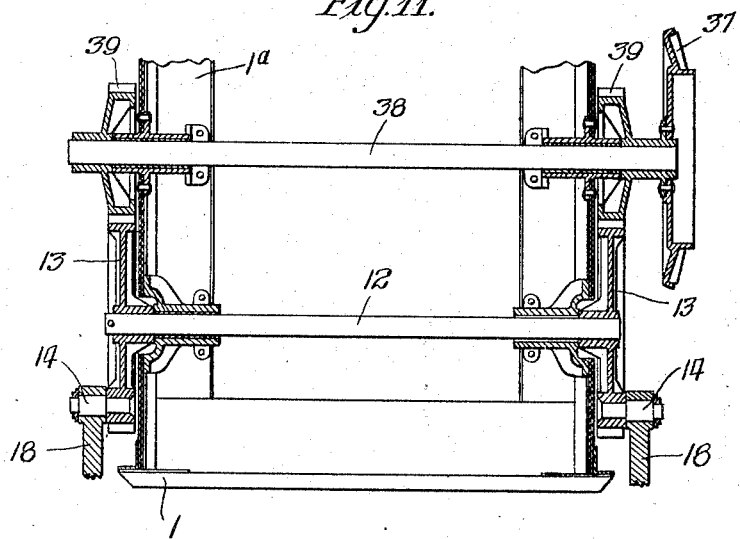
Fig. 11 is a section taken approximately on line 11—11 of Fig. 2, the scale being the same as that of Fig. 10.

The shaft, 12, is driven from the pinions 39, the parts being so proportioned that the gear wheels, 13, on the shaft, 12, mesh with the pinions, 39, as best shown in Fig. 11.

The discharge belt, 32, is driven from the main shaft, 35, by means of a train of gearing, 45, between the main shaft and one of the rollers, 46, over which the belt passes.

The main shaft is driven from an engine, 50, or other suitable prime mover or power device supported on the frame in advance of the excavating mechanism. Where the power device is a steam engine, the boiler, 51, may be hung in the frame in proximity to the engine. In the arrangement shown, the engine shaft, 52, is geared to a horizontal longitudinally extending shaft, 53, by a train of gearing, 54. The shaft, 53, is geared to the main shaft 35 by a suitable train of gearing containing an intermediate member, 55, which may be moved into and out of operative relation with the rest of the train and thus serve as a clutch for connecting the main shaft to and disconnecting it from the driving shaft. A simple way of controlling the gear, 55, is to arrange it loosely on the shaft, 56, which is screwed at one end, as indicated at 57, into a stationary part of the structure; a handle, 58, being provided for turning the shaft and thus screwing it in or out and carrying the gear wheel 55 axially into or out of operative position.

In moving the machine about from place to place it is desirable that it travel at a much greater speed than that at which it travels while excavating. It is also desirable that the speed at which it travels while excavating may be varied for a given speed of operation of the shovel. I have therefore provided driving means which will permit the machine to be propelled at a fairly rapid rate and at a plurality of low speeds. To this end I have arranged a horizontal shaft, 60, in proximity to the front end of the shaft 53; the shafts 60 and 53 being connected together by bevel gears, 61. The shaft, 60, does not extend entirely across the machine but is placed in alinement with another shaft, 62, which lies on the opposite side of the machine. The inner end of the shaft 62 is supported in a sleeve, 63, fixed on the shaft 60. The free end of the sleeve 63 forms part of a clutch, 64, by means of which the shafts 60 and 62 may be coupled together so as to operate as a single shaft. On the outer end of the shaft, 62, is a sprocket wheel, 65, over which passes a sprocket chain, 66. The operation of the shaft 62 through the sprocket wheel and sprocket chain 66 causes the machine to travel in one direction or the other, depending upon the direction in which the engine is running, which will hereinafter be described. Loose on the shaft 62 is a worm wheel, 67, one end of whose hub forms part of the clutch 64, the latter being a double clutch by means of which the worm wheel is clutched to the shaft 62 when the latter is unclutched from the shaft 60. In front of and at right angles to the shafts 60 and 62 is a shaft, 68, driven from the shaft 60 by bevel gears, 69. Loose on the shaft 68 are gear wheels, 70 and 71, meshing respectively with gear wheels, 72 and 73, fixed on an intermediate shaft. The gear wheel 72 in turn meshes with a gear wheel, 74, on a longitudinal shaft, 75, for driving the worm wheel, 67, through the usual worm, not shown. On the shaft 68 is a double clutch, 76, adapted to connect either of the gear wheels 70 and 71 to the shaft while the other is unclutched from the shaft.

It will be seen that when the shaft 62 is coupled to the shaft 60, the propelling sprocket chain is driven directly from the shaft 60 while upon unclutching the shaft 60 from the shaft 62 and driving the latter through the worm wheel 67 a great reduction in speed is obtained. It will further be seen that when the drive is through the worm wheel two different slow speeds may be obtained by throwing the clutch 76 one way or the other and bringing into play one or the other of the trains of transmission gears beginning with the gears 70 and 71 respectively. The high speed obtained by driving directly from the shaft 60 through the shaft 62 is the one employed when the machine is traveling from one place to another while the low speeds are employed during the process of excavating; the selection of the speed to be used while excavating depending upon the nature of the work.

In the arrangement shown the machine is propelled by rotating the intermediate roller-like support 78. This is accomplished by providing the member 78 at one end with gear teeth, 79. A horizontal adjustable shaft, 80, is mounted on the frame just in advance of the roller 78, and on this shaft is a pinion, 81, which meshes with the gear teeth 79. On the outer end of the shaft 80 is a sprocket wheel, 82, over which passes the sprocket chain 66. There are two other features that have to do with controlling the character of the excavation that I regard of considerable importance. One of these features has to do with varying the depth of the cut in a simple and convenient manner and, if desired, while the excavation is going on. The other feature has to do with adjusting the transverse cutting edge of the shovel to any desired angle within limits, and maintaining it at such angle even though the ground should lack such uniformity in character as to cause the rollers or wheels to sink in more deeply on one side than on the other and thus tilt the machine bodily. The first of these features is taken care of at the front end of the machine where the body of the machine is supported from the front axle, 83, by a post, 84, which extends upwardly into a sleeve, 85, rotatable in the frame of the machine but held against up and down movement therein. The post 84 is made tubular in form and the interior thereof between its ends is provided with a nut, 86. A vertical threaded shaft, 87, extends down into the post and through the nut. The shaft is provided with a collar, 88, near its upper end on which the frame of the machine rests and by which it is supported. It will be seen that by turning the shaft 87 the frame of the machine will be raised or lowered, thus tilting the machine as a whole about the intermediate rolling support, 78, and lowering or raising the cutting edge of the shovel. The shaft 87 may conveniently be operated from a longitudinal shaft, 89, through an intermediate shaft, 90, which at its upper end drives the shaft 87 through bevel gears, 91. Loose on the shaft 90 are two oppositely disposed bevel gears, 92 and 93, meshing with a bevel gear, 94, on the shaft 89. A clutch, 95, serves to couple either of the gears 92 and 93 to the shaft 90 and, because these two gears are reversely arranged, permits the shaft 87 to be rotated in either the direction to raise the front end of the machine or in the direction to lower the front end of the machine.

The post 84 and the sleeve 85 serve another purpose which is to steer the machine. To this end the post and the sleeve are connected together in any suitable way so that they are compelled to turn with each other while free to move independently of each other in the vertical direction. This connection may conveniently take the form of a key, 96, as shown in Fig. 6, fixed to the sleeve and entering a keyway, 97, in the post. On the upper end of the sleeve, 85, is fixed a quadrant gear, 98, which also serves as a shoulder to prevent the sleeve from dropping down through the framework. The gear is driven by a worm, 99, or otherwise which is in turn actuated from a suitable steering shaft, 100, leading to a convenient point at which the operator will be stationed; the position of the operator being at about the middle of the machine where he can see everything that is going on both in front and in back and at both sides of the machine, so that he can take care of the engine, watch the steering in either direction, note what the excavating mechanism is doing, see that the material is properly discharged, and correct anything that goes wrong.

The adjustment of the shovel to bring and keep its cutting edge at the desired angle is also effected by bodily shifting the machine on its supports. This is conveniently accomplished as best shown in Figs. 2 and 8, by providing the supporting roller, 78, with an axle, 101, whose journals are contained in journal boxes, 102, slidably mounted in suitable pedestals, 103 and 104. On one side of the machine the weight is taken by a spring, 105, lying between a fixed cross piece, 106, between the pedestals and the top of the corresponding journal box. On the other side of the machine, instead of the stationary cross piece, 106, there is a movable cross head, 107, screw threaded at its ends upon two upright screw threaded shafts, 108. The spring, 105, lies between this cross head and the journal box 102 just as on the opposite side of the machine; but, by turning the shafts 108, the cross head, 107, is screwed up or down and therefore the corresponding side of the machine is lowered or raised. For the purpose of turning the shafts 108 I have provided each of them with a gear wheel, 109, near the upper end and between these gear wheels I place a pinion, 110, secured upon the lower end of a vertical shaft, 111. The shaft 111 lies just below the shaft 53. On the upper end of the shaft 111 is a bevel gear, 112, meshing with two bevel gears, 113 and 114, loose on the shaft 53. Suitable clutches, 115, are provided for coupling the gear wheels 113 and 114 to the shaft 53 so that the vertical shaft, 111, may be rotated at will in either direction. With this arrangement, whenever the operator sees that the surface which is being left after the material has been excavated is getting out of true because one side of the machine is resting on a soft spot, or for any other reason, he can immediately correct matters by raising or lowering the adjustable side of the machine, thus varying the angle of the cutting edge of the shovel.

In Figs. 12, 13 and 14 I have shown a slight modification of the excavating shovel, there being a U-shaped member, 120, similar to the yoke 8 heretofore described but preferably somewhat wider so as to extend farther toward the front of the shovel. The curved bottom plate, 121, is secured at the rear upon the yoke portion of the member 120 and is provided at its front end with a cutter bar, 122, similar to the cutter bar 11, having at its ends journals, 123. The inner faces of the arms of the member 120 are vertical and lying against them and riveted or otherwise secured thereto are side plates, 124, forming side walls to the shovel; these side plates being continued down past the cutter bar and around the journals. The plates 124 therefore serve both as side walls for the shovel and as supports for the front end of the shovel, including the cutter bar, doing away with the arms or links 9 of the other form. The members 125 corresponding to the members 15 in the other form, serve as side cutters having vertical inner faces although at the front edges they flare outwardly as indicated at 126. Forwardly projecting teeth, 127, are secured to the side cutters. At their upper ends the members 125 fit into a groove or recess, 128, in the arms of the member 120, thus preventing the members 125 from being displaced laterally while allowing them perfect freedom of oscillation about the trunnions 123.

The rear end of the plate 121 is bent downwardly somewhat as indicated at 129 and the rear edges of the side plates 124 are bent outwardly somewhat as indicated at 130; thus providing a flaring mouth at the rear end of the shovel which will permit the ready entrance of the auxiliary shovel or scoop.

Aside from its simplicity, one of the good features of this form of shovel is that by reason of the closed vertical sides it will be impossible for some obstacle such as a stick or a stone to be caught in the main shovel as it might possibly do in the other form by getting between the arms of the members 8 and the members 9 and thus interfering with the free passage of the auxiliary shovel or scoop through the excavating shovel. By having the sides not only closed but vertical, the auxiliary shovel or scoop may be so designed that it will practically fit between the sides of the excavating shovel or, in other words, come so close to the sides that no obstruction large enough to be of any moment could pass between the sides of the auxiliary shovel or scoop and the main shovel.

It will now be seen that I have produced a machine of great power and of comparatively light weight, due to the distribution of the work of excavating material and removing the same between mechanisms each adapted to do only one thing; the excavating mechanism being made very powerful but, because of its peculiar construction, of a light weight; and the elevating and discharging mechanism, because of the relatively light work it has to do, being also light in weight,—the manner in which power is applied to the cage assisting greatly in producing this result. It will also be seen that the machine is adjustable instantly, and while in operation, to vary the depth of the cut or the angle of the cutting edge of the shovel, and also to vary the rate at which the machine is fed into the material to be excavated without varying the speed at which the shovel is reciprocated. It will also be seen that the machine as a whole, while containing no delicate parts, is extremely flexible and sensitive to control and that all operations are carried out in such a way that the engineer or other operator can easily keep watch thereover and thus insure rapid, accurate work.

While I have illustrated and described in detail only a single preferred embodiment of my invention, with a single slight modification, I do not intend to be limited to the exact structural details thus illustrated and described; but intend to cover all forms and arrangements which come within the terms employed in the definitions of my invention constituting the appended claims.

I claim:

1. In a machine of the character described, a main shovel, means for actuating it through successive digging strokes, a series of auxiliary shovels, and means coördinated with the aforesaid means for moving the auxiliary shovels through the main shovel during successive cycles of the main shovel in such time relation thereto as to cause each shovelful dug by the main shovel to be taken up by the auxiliary shovels and thus relieve the main shovel mechanism of the load imposed thereon by each shovelful of material and clear the main shovel for the reception of the next shovelful which is to be dug.

2. In a machine of the character described, a main shovel, means for actuating it through successive digging strokes, a series of auxiliary shovels each having a capacity as great as that of the main shovel, and means for moving said auxiliary shovels through the main shovel in such time relation that each auxiliary shovel as it passes through the main shovel takes up therefrom the last shovelful which has been dug.

3. In a machine of the character described, a main shovel, means for actuating it through successive digging strokes, an auxiliary shovel having a capacity as great as that of the main shovel, and means for moving the auxiliary shovel through the main shovel in such time relation thereto as to permit the auxiliary shovel to take up the last shovelful which may have been dug up by the main shovel.

4. In a machine of the character described, a main shovel, means for actuating it through a digging stroke, an auxiliary shovel having a capacity as great as that of the main shovel, and means for moving the auxiliary shovel through the main shovel in such time relation to the latter to cause the auxiliary shovel to take up the material dug up on said digging stroke.

5. In a machine of the character described, a main shovel, means for actuating it through successive digging strokes, an auxiliary shovel having a capacity as great as that of the main shovel, and means for moving the auxiliary shovel through the main shovel in such time relation thereto to cause the auxiliary shovel to take up from the main shovel the material dug up on one of said digging strokes to clear the main shovel for the reception of the material dug up on the next stroke.

6. In a machine of the character described, a main shovel supported so as to have digging movements whose general nature is reciprocatory, an auxiliary shovel having a capacity as great as that of the main shovel, and means for moving the auxiliary shovel through the main shovel in such time relation thereto as to cause it to take up from the main shovel a shovelful of material which has just been dug and clear the main shovel for the reception of the next shovelful to be dug.

7. In a machine of the character described, a main shovel suspended so as to have digging movements whose general nature is reciprocatory, an auxiliary shovel having a capacity as great as that of the main shovel, supported above the main shovel, and means for moving the auxiliary shovel forwardly through the main shovel in such time relation as to cause the auxiliary shovel to take up from the main shovel a shovelful dug on one digging stroke and clear the main shovel for the reception of the material to be dug on the next stroke.

8. In a machine of the character described, a frame, a main shovel hung from the frame so as to have a digging movement whose general nature is reciprocatory, an endless conveyer supported on the frame above the said main shovel independently of and having a part extending into the vicinity of the path of movement of the latter, a series of auxiliary shovels on said conveyer, and means for actuating said conveyer in such time relation to the main shovel as to cause the auxiliary shovels to pass through the main shovel and take up therefrom each shovelful as it is dug and clear the main shovel for the reception of the material to be dug on the next digging stroke and relieve the main shovel mechanism of the load imposed thereon by each shovelful of material.

9. In a machine of the character described, a frame, an endless conveyer mounted on the frame and extending generally in an up and down direction, a main shovel supported on the frame independently of the conveyer and adapted to have a generally-reciprocatory digging movement transverse to the general direction of the conveyer, auxiliary shovels on said conveyer, and means for actuating said main shovel and said conveyer in such time relation to each other that the auxiliary shovels pass through the main shovel and take up therefrom each shovelful as it is dug and clear the main shovel for the reception of the material to be dug on the next digging stroke.

10. In a machine of the character described, a frame, a main shovel hung on the frame and adapted to have digging movements whose general nature is reciprocatory, an endless conveyer independent of the shovel mounted on the frame above and having a portion extending into proximity to the path of the said main shovel, auxiliary shovels on said conveyer, and means for actuating said main shovel and said auxiliary shovels in such time relation to each other that the auxiliary shovels pass forwardly through the main shovel and in such close proximity thereto as to cause them to scoop up each shovelful as it is dug and clear the main shovel for the reception of the next shovelful to be dug.

11. In a machine of the character described, a frame, a main shovel hung on the frame so as to have digging movements whose general nature is reciprocatory, an endless conveyer supported by the frame above the aforesaid shovel and having a part extending into proximity to the path of the latter, a series of auxiliary shovels on the conveyer each having a capacity as great as that of the main shovel, and means for actuating said conveyer and said main shovel in such time relation to each other that one of the auxiliary shovels passes through the main shovel during each cycle of movements of the latter and takes up therefrom the shovelful of material which has just been dug so as to clear the main shovel for the reception of the next shovelful to be dug.

12. In a machine of the character described, a frame, a main shovel hung on the frame so as to have digging movements whose general nature is reciprocatory, an endless conveyer supported by the frame above the aforesaid shovel and having a part extending into proximity to the path of the latter, a series of auxiliary shovels on the conveyer each having a capacity as great as that of the main shovel, and means for actuating said conveyer and said main shovel in such time relation to each other that one of the auxiliary shovels passes forwardly through the main shovel during each cycle of movements of the latter and takes up therefrom the shovelful of material which has just been dug so as to clear the main shovel for the reception of the next shovelful to be dug.

13. In a machine of the character described, a frame, a main shovel hung on the frame so as to have digging movements whose general nature is reciprocatory, an endless conveyer mounted on the frame above the aforesaid shovel and having a part extending into proximity to the path of travel of the latter, a series of auxiliary shovels carried by the conveyer, and coördinated means for actuating said conveyer and said main shovel in such positive time relation to each other that the auxiliary shovels pass forwardly through the main shovel and take up therefrom each shovelful of material as it is dug and clear the main shovel for the reception of the next shovelful to be dug.

14. In a machine of the character described, a frame, a digging shovel suspended from the frame so as to hang approximately horizontal and be capable of swinging back and forth for digging purposes, scavenging mechanism mounted on the frame above the shovel, means for actuating said shovel, and means coördinated with the aforesaid means for actuating said scavenging mechanism in such time relation to the shovel that said mechanism automatically enters the shovel during each cycle of the latter and takes up therefrom and retains each shovelful as it is dug, thereby clearing the shovel for the reception of the next shovelful of material and relieving the shovel mechanism of the load imposed upon it by each shovelful of material.

15. In a machine of the character described, a frame, a continuously movable approximately horizontal main shovel the general nature of whose movement is reciprocatory mounted on the frame, an endless conveyer mounted on the frame above and independently of the main shovel, auxiliary shovels on the conveyer, and means for actuating said main shovel and said conveyer in such time relation to each other that the auxiliary shovels enter the main shovel and scoop up therefrom the excavated material.

16. In a machine of the character described, a frame, a continuously movable approximately horizontal main shovel the general nature of whose movements is reciprocatory mounted on the frame, an endless conveyer mounted on the frame above and independently of the main shovel, auxiliary shovels on the conveyer, and means for actuating said main shovel and said conveyer in such time relation to each other that the auxiliary shovels enter the main shovel and scoop up therefrom each shovelful of material as soon as it is dug up and thus empty the main shovel after each digging stroke.

17. In a machine of the character described, a frame, a short digging shovel hung from the frame so as to take an approximately horizontal position and be capable of digging movements whose general nature is reciprocatory, an elevated receiver, an endless conveyer mounted on the frame independently of the shovel, auxiliary shovels on the conveyer adapted to enter the digging shovel and carry material therefrom to the receiver, and means for actuating said digging shovel and the conveyer in such time relation to each other that the auxiliary shovels empty the digging shovel during each cycle comprising a digging stroke and a return stroke.

18. In a machine of the character described, a frame, a main shovel hung on said frame so as to be capable of forward digging movements alternating with return movements, a series of auxiliary shovels mounted on the frame above the main shovel, and means for actuating said shovels in such time relation to each other that the auxiliary shovels enter the main shovel during the return movements of the latter to take up therefrom and retain the excavated material and remain clear of the main shovel during the cutting movement of the latter.

19. In a machine of the character described, a main shovel, means for actuating the same through successive digging strokes alternating with return strokes, an auxiliary shovel, and means for operating said shovels in such time relation that the auxiliary shovel enters and moves forward through the main shovel and scoops up therefrom the excavated material at the same time that the main shovel is on a return stroke so that the relative motion between the shovels is greater than the movement of either relatively to a fixed point.

20. In a machine of the character described, a frame, a main shovel hung on said frame so as to be capable of forward digging movements alternating with return movements, an auxiliary shovel supported on the frame above and independently of the main shovel, and means for moving said shovels independently of each other and in such time relation that the auxiliary shovel swings forwardly through the main shovel while the latter is on a return stroke and takes up therefrom the material dug up on the preceding digging stroke.

21. In a machine of the character described, a frame, a main frame mounted on the frame so as to hang approximately horizontal and be capable of swinging forward and backward in alternating digging and return movements, an auxiliary shovel supported on the frame above and independently of the main shovel, and means for operating said shovels in such time relation to each other that the auxiliary shovel moves forward in proximity to and substantially parallel with the main shovel while the latter is traveling backward and takes up therefrom and retains the material dug up on the preceding digging movement.

22. In a machine of the character described, a frame, a main shovel movably hung on the frame so as to take a position approximately horizontal, actuating means including a part attached to the said shovel near the cutting edge and exerting a pull in a direction which is generally tangential, an elevated receiver, an endless conveyer mounted on the frame independently of the said shovel and extending in proximity to both the said shovel and the receiver, auxiliary shovels on the conveyer, and means for actuating the main shovel and the conveyer in such time relation to each other that the auxiliary shovels travel through the main shovel and take up therefrom each shovelful as it is dug and clear the main shovel for the reception of the next shovelful to be dug.

23. In a machine of the character described, a frame, a shovel suspended from the frame so as to hang approximately horizontal and be capable of forward digging strokes alternating with backward return strokes, a cage mounted on the frame above the shovel so as to be rotatable about a horizontal axis, a receiver extending through said cage, an endless conveyer surrounding the cage and having a driving connection therewith, means on the conveyer for entering the shovel and carrying material excavated thereby to the receiver, and means for actuating said conveyer and said shovel in such time relation that the aforesaid means on the conveyer empties the shovel after each digging stroke of the latter.

24. In a machine of the character described, a frame, a main shovel suspended from the frame so as to hang approximately horizontal and be capable of swinging forward and backward through alternating digging and return strokes, a cage mounted on the frame above the said shovel so as to be rotatable about a horizontal axis, a receiver extending through said cage, an endless conveyer surrounding the cage and in driving relation therewith, auxiliary shovels on said conveyer adapted to pass in proximity to the shovel when the conveyer is actuated, and means for actuating the conveyer and the main shovel in such time relation that the auxiliary shovels enter the main shovel and remove therefrom the material as it is dug up by the main shovel.

25. In a machine of the character described, a shovel, a horizontal crank, means for suspending the shovel from said crank in such a manner that the shovel tends normally to hang in a horizontal position below the crank, means for rotating the crank, and means acting on the shovel to swing the same in both directions from the aforesaid position.

26. In a machine of the character described, a shovel, a horizontal crank, members journaled on the crank and connected to the shovel to support the latter and cause it to tend to assume an approximately horizontal position below the crank, a second crank in advance of the aforesaid crank, and a connecting rod between the second crank and the shovel of a length such as to cause the shovel to be swung in both directions from the aforesaid position when the cranks are operated.

27. In a machine of the character described, a horizontal crank shaft, a shovel lying beneath the crank shaft, a member secured at the ends of the shovel and journaled on said crank shaft to support the shovel, a second crank shaft in advance of the aforesaid crank shaft, and means including side cutters for connecting the second crank shaft to the shovel.

28. In a machine of the character described, a horizontal crank shaft, a shovel lying beneath the crank shaft, a member secured at the ends of the shovel and journaled on said crank shaft to support the shovel, a second crank shaft in advance of the aforesaid crank shaft, and means including upwardly extending side cutters attached to the front end of the shovel for connecting the shovel to the second crank shaft.

29. In a machine of the character described, a horizontal crank shaft, a shovel lying beneath the crank shaft, members arranged at opposite ends of the shovel and attached at their lower ends to the shovel and supported at their upper ends on the crank shaft, upwardly projecting side cutters journaled at their lower ends to the front end of the shovel, and means connected to said side cutters for swinging the shovel on said crank shaft.

30. In a machine of the character described, a horizontal crank shaft, a shovel lying beneath said shaft, suspending devices journaled on the crank shaft and connected to the shovel at opposite ends of the latter, a second crank shaft in advance of the aforesaid crank shaft, upwardly extending side cutters pivotally connected at their lower ends to the front end of the shovel, and connecting rods extending between the second crank shaft and said side cutters.

31. In a machine of the character described, a horizontal crank shaft, a shovel lying beneath said shaft, suspending devices journaled on the crank shaft and connected to the shovel at opposite ends of the latter, a second crank shaft in advance of the aforesaid crank shaft, upwardly extending side cutters pivotally connected at their lower ends to the front end of the shovel, connecting rods extending between the second crank shaft and said side cutters, and swinging arms extending between the points of connection between the connecting rods and said side cutters and stationary points of support.

32. In a machine of the character described, a shovel, a horizontal crank, members journaled on the crank and connected to the shovel to support the latter, a second crank above and in advance of the aforesaid crank, a connecting rod between the second crank and the shovel, a swinging arm, and a connection between the lower end of the connecting rod and said arm.

33. In a machine of the character described, a horizontal shaft, separated sprocket wheels on said shaft, crank pins projecting outwardly from said sprocket wheels, a shovel lying beneath said shaft, supporting members extending from the shovel upwardly to and journaled on said crank pins, means acting on the shovel to give it movements in addition to those resulting from the mere rotation of said shaft, endless sprocket chains passing at their lower ends around said sprocket wheels, and scoops or buckets extending between said sprocket chains and adapted to pass across the upper surface of the shovel and remove therefrom material excavated by the shovel.

34. In a machine of the character described, a frame, a horizontal shaft supported below the frame, sprocket wheels spaced apart on said shaft, crank pins projecting outwardly from said sprocket wheels, a shovel beneath said shaft, supporting members projecting upwardly from the shovel and journaled upon said crank pins, a horizontal cylindrical cage above said frame, said cage having sprocket wheels lying in the same vertical planes as the aforesaid sprocket wheels, sprocket chains passing over the upper and lower sprocket wheels, scoops or buckets extending between said sprocket chains for passing over and through the shovel to remove material excavated by the shovel, and means for moving the shovel back and forth while it is being moved by the revolving sprocket wheels.

35. In a machine of the character described, a frame, a horizontal shaft supported below the frame, sprocket wheels spaced apart on said shaft, crank pins projecting outwardly from said sprocket wheels, a shovel beneath said shaft, supporting members projecting upwardly from the shovel and journaled upon said crank pins, a horizontal cylindrical cage above said frame, said cage having sprocket wheels lying in the same vertical planes as the aforesaid sprocket wheels, sprocket chains passing over the upper and lower sprocket wheels, scoops extending between said sprocket chains for passing over and through the shovel to remove material excavated by the shovel, means for moving the shovel back and forth while it is being moved by the revolving sprocket wheels, and an endless discharge belt extending through the interior of said cage, the parts being so proportioned and arranged that the scoops empty their contents on said discharge belt as they travel over the cage.

36. In a machine of the character described, a frame, excavating means projecting downwardly below the frame, a rolling support beneath the frame, a driving mechanism extending downwardly from one side of the frame to one end of said rolling support, and means between the other side of the frame and the other end of the rolling support for tilting the frame about a longitudinal axis.

37. In a machine of the character described, a movable carriage including a frame, a single shovel mounted below the frame so as to be movable back and forth in the general direction of travel of the carriage, a horizontal cylindrical cage above the frame, an endless conveyer including chains connected by transverse auxiliary shovels passing over said cage and in proximity to the shovel for removing from the shovel the material excavated thereby, and a receiver for excavated material extending through the interior of the cage, the parts being so constructed and arranged that the auxiliary shovels or scoops discharge their contents into the receiver as they pass over the top of the cage.

38. In a machine of the character described, a frame, a main shovel suspended from the frame so as to be capable of swinging forward and backward through alternating digging and return strokes, a cage mounted on the frame above the shovel so as to be rotatable about a transverse horizontal axis, a receiver extending into said cage, an endless conveyer surrounding the cage and in driving relation therewith, an auxiliary shovel having a capacity as great as that of the main shovel supported on the conveyer, and means for actuating the main shovel and the conveyer in such time relation to each other that the auxiliary shovel enters the main shovel and clears it of its load and then carries the load upwardly and delivers it to the receiver.

39. In a machine of the character described, a main shovel, means for actuating it so as to have digging movements whose general nature is reciprocatory, an auxiliary shovel, and means for actuating the latter so as to cause it to enter the main shovel at the rear end thereof and pass forwardly through the same in close relation thereto until it reaches the vicinity of the cutting edge of the main shovel.

40. In a machine of the character described, a main shovel, means for actuating it through successive digging strokes, a series of auxiliary shovels, and means coördinated with the aforesaid means for moving the auxiliary shovels in such positive time relation to the main shovel that they enter the main shovel at the rear and pass forwardly through the same in proximity thereto and take up each shovelful dug by the main shovel and clear the main shovel for the reception of the next shovelful which is to be dug.

41. In a machine of the character described, a swinging main digging shovel, an auxiliary shovel, and means for actuating said shovels in such time relation to each other that the auxiliary shovel enters the main shovel at the rear and follows the contour of the main shovel forwardly to take up from the main shovel the material dug by the latter.

42. In a machine of the character described, a frame, a main shovel hung from the frame so as to have a digging movement whose general nature is reciprocatory, an endless conveyer supported on the frame above the aforesaid shovel and having a part extending into the vicinity of the path of movement of the latter, a series of auxiliary shovels on the conveyer, and means for actuating said conveyer and said main shovel in such relation to each other as to cause the auxiliary shovels to enter the main shovel at the rear and follow the contour of the main shovel forwardly so as to take up from the main shovel each shovelful as it is dug by the latter.

43. In a machine of the character described, a shovel, means for supporting the shovel so as to permit the cutting edge thereof to move through a curved path whose general nature is reciprocatory, a member rigidly connected to the shovel near the cutting edge of the latter, a driving crank, a connecting rod extending between said crank and the aforesaid member, and an arm connected at one end to the joint between said connecting rod and said member and hinged at its other end so as to be capable of swinging movements about a stationary axis.

In testimony whereof I sign this specification.

WALTER M. WICKHAM.

Copies of this patent may be obtained for five cents each, by addressing the "Commissioner of Patents, Washington, D. C."